(12) United States Patent
Lammens et al.

(10) Patent No.: US 12,492,975 B2
(45) Date of Patent: Dec. 9, 2025

(54) METHOD AND SYSTEM FOR GENERATING A TEST COUPON SPECIFICATION FOR PREDICTING FATIGUE LIFE OF A COMPONENT

(71) Applicant: Siemens Industry Software NV, Leuven (BE)

(72) Inventors: Nicolas Lammens, Herent (BE); Matthias Schulz, Kaiserslautern (DE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 0 days.

(21) Appl. No.: 18/577,955

(22) PCT Filed: Jun. 8, 2022

(86) PCT No.: PCT/EP2022/065534
§ 371 (c)(1),
(2) Date: Jan. 9, 2024

(87) PCT Pub. No.: WO2023/280498
PCT Pub. Date: Jan. 12, 2023

(65) Prior Publication Data
US 2024/0264052 A1  Aug. 8, 2024

(30) Foreign Application Priority Data
Jul. 9, 2021 (EP) .................................... 21184818

(51) Int. Cl.
*G01N 3/02* (2006.01)
*G06N 20/00* (2019.01)
(52) U.S. Cl.
CPC ............... *G01N 3/02* (2013.01); *G06N 20/00* (2019.01); *G01N 2203/0073* (2013.01); *G01N 2203/0214* (2013.01); *G01N 2203/0298* (2013.01)

(58) Field of Classification Search
CPC ............. G01N 3/02; G01N 2203/0073; G01N 2203/0214; G01N 2203/0298; G06N 20/00
See application file for complete search history.

(56) References Cited

U.S. PATENT DOCUMENTS

| 11,571,740 B2 * | 2/2023 | Korneev ................. B33Y 50/00 |
| 2003/0088373 A1 * | 5/2003 | Fields ...................... G06F 30/23 |
| | | 702/42 |

(Continued)

FOREIGN PATENT DOCUMENTS

| CN | 109614721 A | 4/2019 |
| CN | 111523268 A | 8/2020 |

(Continued)

OTHER PUBLICATIONS

Nikishkov, Yuri and et al. "Progressive fatigue damage simulation method for composites." International Journal of Fatigue 48 (2013): 266-279 (Year: 2013).*

(Continued)

*Primary Examiner* — Douglas Kay
(74) *Attorney, Agent, or Firm* — LEMPIA SUMMERFIELD KATZ LLC

(57) ABSTRACT

A method for generating a test coupon specification for predicting fatigue life of a component includes determining a load condition for the component, providing a component design, and performing a strength analysis of the component design under the load condition determining a critical area of the component and a stress-related parameter of the critical area. The method includes providing a material condition of the component at least for the critical area of the component. To assist an end-user in determining which are optimal tests to be performed in order to obtain most relevant data for fatigue prediction of a specific component, the method also includes providing a material model and providing, as an (Continued)

input to the material model, the stress-related parameter, and the material condition. The material model generates, as an output, a test coupon specification for being tested in a testing machine.

16 Claims, 2 Drawing Sheets

(56) References Cited

U.S. PATENT DOCUMENTS

| | | | |
|---|---|---|---|
| 2020/0283591 A1* | 9/2020 | Azarov | C08J 5/248 |
| 2021/0140860 A1* | 5/2021 | Kline | G01N 3/08 |
| 2022/0051141 A1* | 2/2022 | Kabir | G01N 3/08 |

FOREIGN PATENT DOCUMENTS

| | | | | |
|---|---|---|---|---|
| CN | 112100765 A | | 12/2020 | |
| CN | 112597687 A | | 4/2021 | |
| CN | 111523268 B | * | 6/2021 | ............ G06F 30/23 |
| EP | 3459715 A1 | | 3/2019 | |
| WO | 2018217903 A1 | | 11/2018 | |
| WO | WO-2019202107 A1 | * | 10/2019 | ............ B33Y 50/00 |
| WO | 2020216458 A1 | | 10/2020 | |
| WO | WO-2022028419 A1 | * | 2/2022 | ............ G01M 13/04 |

OTHER PUBLICATIONS

Huang, Yuner, and Ben Young. "The art of coupon tests." Journal of Constructional Steel Research 96 (2014): 159-175 (Year: 2014).*
Fabian, Andrew S. "Effective Integration of Additive Manufacturing at a Large Manufacturing Company." PhD diss., Massachusetts Institute of Technology, Jun. 2021 (Year: 2021).*
PCT International Search Report and Written Opinion of International Searching Authority mailed Sep. 30, 2022 corresponding to PCT International Application No. PCT/EP2022/065534.
International Preliminary Report on Patentability mailed Sep. 26, 2023, corresponding to PCT International Application No. PCT/EP2022/065534.

* cited by examiner

METHOD AND SYSTEM FOR GENERATING A TEST COUPON SPECIFICATION FOR PREDICTING FATIGUE LIFE OF A COMPONENT

This application is the National Stage of International Application No. PCT/EP2022/065534, filed Jun. 8, 2022, which claims the benefit of European Patent Application No. EP 21184818, filed Jul. 9, 2021. The entire contents of these documents are hereby incorporated herein by reference.

FIELD

The present embodiments relate to a method for predicting fatigue life of a component.

BACKGROUND

This background description may contain ideas pertinent to the invention that reveal problems of systems or processes, only some parts of which may be fully disclosed to the public, if any. The disclosure should therefore not be interpreted as evidence that the aspects mentioned herein are part of the public disclosure or prior art.

The American Society for Testing and Materials (ASTM) defines fatigue strength as "the value of stress at which failure occurs after a defined number of load cycles." The ASTM defines fatigue limit as "the limiting value of stress at which failure occurs as the number of cycles becomes very large."

In reverse, this provides that a fatigue limit is the stress level below which an infinite number of loading cycles may be applied to a material without causing fatigue failure. Where materials do not have a distinct limit, the term fatigue strength or endurance strength is used and is defined as the maximum value of completely reversed bending stress that a material can withstand for a specified number of cycles without a fatigue failure.

It is known that properties such as surface roughness, porosities, heat treatments, and others may affect how the material reacts to a fatigue load.

From CN 112 100 765 A, a method is known to determine dimensions and loads of a flat test piece for a material test. From CN 109 614 721 A, a method is known to determine the impact of a defect on fatigue life. Both publications consider the material to be a deterministic given property.

Document WO 2018/217903 A1 discloses a method to improve additive manufacturing using the trained algorithm to classify defects.

Document EP 3 459 715 A1 shows a method to predict defects in an on-line monitoring fashion.

Document WO2020216458A1 [N. Lammens] relates to a method and for fatigue life prediction of additive manufactured components accounting for localized material properties. Training a machine learning system with the collected data includes a data point relating to maximum stress vs. cycles to failure for different given processing steps, surface and volume conditions of an element, specimen, or material structure. To collect training data for a machine learning system, many tests are to be performed.

The machine learning method proposed in WO2020216458A1 relies on training a machine learning system, respectively a covariance function, that determines how correlated two individual test samples are. A simplified interpretation of such a covariance function is to regard it as a "distance" metric containing all the different influencing parameters (e.g., the surface roughness or the print orientation in an additive manufacturing component). When two samples are "close" together, their results are equally tied together, while the opposite holds for samples "far away" from each other.

In general, such covariance functions (e.g., many different functions exist) are solely driven by the input parameters (e.g., surface roughness, build orientation . . . ) and are basically not affected by the output (e.g., the actual fatigue performance of the sample).

While characterization of fatigue performance may be performed through elementary coupon testing, it is often difficult, if not impossible, to reproduce the exact conditions present in the component on these elementary coupons. This limitation may be both attributed to production limitations (e.g., certain angles cannot be printed in additive manufacturing without additional supports) as well as due to different material responses (e.g., due to different thermal behavior of smaller coupons compared to larger components).

As a result, an end-user is often faced with the challenge of selecting which coupons to manufacture given that none of the coupons will perfectly match the conditions in the component. There are different approaches that may conventionally be used to cope with such problem: 1. The user may use experience to select a set of coupons; and 2. The user uses a very broad range of samples in hopes of capturing the most important behavior. The downside of this method is that the success is largely dependent on the experience of the operator. In addition, such test campaigns rarely achieve true optimal results and will result in more tests than objectively required. Another approach may be used: 3. To cope with this issue, in particular, when dealing with additive manufacturing, some researchers have proposed to print the actual component and cut-out test specimens from this component to provide that the exact material conditions are achieved.

One issue of this approach is that for many components, the coupons must become unfeasibly small (e.g., due to curvatures in the component surface or just overall dimensions of the full component). In addition, the benefit of performing material characterization on coupon level (e.g., cheaper and faster) is completely lost when actual components need to be printed for testing.

The issue with fatigue characterization of additive manufacturing materials has been recognized in the past by the American Society for Testing and Materials [ASTM]. ASTM spent significant effort in trying to define new standards and methods adapted to this methodology. Printing ASTM compliant geometries with additive manufacturing involves significant costs

SUMMARY AND DESCRIPTION

The scope of the present invention is defined solely by the appended claims and is not affected to any degree by the statements within this summary.

The present embodiments may obviate one or more of the drawbacks or limitations in the related art. For example, an end-user is assisted in determining which are optimal tests to be performed in order to obtain most relevant data for fatigue prediction of a specific component. As another example, costs of printing ASTM compliant geometries may be reduced. As yet another example, proper material conditions may also be achieved.

For the purpose of describing the present embodiments, fatigue behavior or fatigue may be characterized as the aspect of how long a component may withstand a certain cyclic load without failure.

The present embodiments include a method including: (e) providing a material model; (f) providing as an input to the material model (i) the at least one stress-related parameter and (ii) the at least one material condition; and (g) the material model generating as an output a test coupon specification for being tested in a testing machine.

Based on the prior art described above and the problems associated, the present embodiments are based on a finite element driven procedure to assist an end-user in determining which are the optimal tests to be performed in order to obtain the most relevant data for fatigue prediction of a specific component. Many advanced materials (e.g., composites or additive manufactured parts) exhibit a complex fatigue behavior. The final performance of such materials and their derived components is highly dependent on the specific material parameters (e.g., surface condition or presence of defects) and the respective manufacturing process (e.g., curing cycle for composites, printing parameters for additive manufacturing). The complexity of component performance assessment is further increased by the spatial variability of these different parameters (e.g., surface roughness in additive manufacturing is dependent on an orientation of a surface of the component within the build space of an additive manufacturing machine that may be a printer). While characterization of fatigue performance may be performed through elementary coupon testing, it may be difficult or even impossible to reproduce the exact conditions present in the component on these elementary coupons. This limitation may be both attributed to production limitations (e.g., certain angles cannot be printed by additive manufacturing without additional supports) as well as due to different material response (e.g., due to different thermal behavior of smaller coupons vs larger components). As a result, conventionally, an end-user is often faced with the challenge of selecting which coupons to manufacture given that none of the coupons will perfectly match the conditions in the component.

The present embodiments include a method where machine learning models are combined with finite element analysis and a description of manufacturing limitations, to automatically determine which are beneficial or ideal coupons to manufacture and test to achieve improved or even maximum accuracy in fatigue prediction of the component.

The present embodiments use a machine learning model that may also be understood as trained covariance functions to calculate how "close" or "far away" a potential new test coupon is from the critical condition in the component. According to the present embodiments, this distance metric is independent of the actual sample performance, and the selection of optimal test coupons may be performed purely computer implemented, respectively numerically without requiring testing. After classification and identification of the optimal coupons, actual testing may be performed to enrich the material model training data and reduce the uncertainty on the predictions near the critical region of the component.

Prior art in testing relies on either experience (e.g., no guarantee for success) or sample cutting from the actual component (e.g., high cost, not always feasible). The procedure according to the present embodiments allows for a repeatable and operator-independent selection of the best test campaign and may account for multiple objective (e.g., in the example described above, focus is put on the critical region, but an identical methodology may be used to focus on overall accuracy of the material model). The key part in the present embodiments is using the machine learning model (e.g., and its covariance function) to identify which samples are most correlated to the condition of interest.

The concept of identifying the impact of a hypothetical new training point on machine learning predictions is a well-known area in AI/machine learning.

Test coupons may have a predetermined geometry (e.g., so the test coupons fit in the test machine and/or according to some standard) and are normally printed in a near-net shape. Those coupons are tested in a universal testing machine that applies a unidirectional load along the length of the coupon.

A stress related parameter may be any parameter related to the stress conditions determined in the strength analysis. The stress related parameter may be an "equivalent stress" value that may include effects such as residual stress (e.g., which may essentially shift the "mean stress" value). As such, residual stress may not be handled as a separate parameter but may be indirectly included in the stress parameter. According to an embodiment, the stress related parameter may be an equivalent stress being determined from the mean stress or residual stress and the variable stresses. Such calculations are known from conventional durability solvers.

According to an embodiment, the temperature history of the component may be a material condition. The material model, in such case, may include a relation that predicts how the fatigue life changes with different temperature histories.

A component design may be provided, for example, in CAD-file from a computer engineering platform or database.

A strength analysis of the component may be a finite element analysis performed on a computer with an engineering software.

These acts may be sequenced automatically or with at least one manual input possibility in-between to decide for one or a number of options to proceed.

According to the present embodiments, the material model is a machine learning fatigue model, where the machine learning model is provided by a method including the acts of: (i) Providing a set of test coupon specifications to the material model, where the test coupon specifications include different material conditions of the component; (ii) collecting data points for maximum stress vs. cycles to failure are collected for said test coupon specifications; (iii) training the material model with the collected data to select a test coupon specification from the set of test coupon specifications when receiving as an input, (i) the at least one stress-related parameter and (ii) the at least one material condition. This kind of model is known from document WO2020216458A1 including training options.

Another embodiment provides that the component is at least in the critical area additive manufactured.

Still another embodiment provides that the component is made at least in the critical area of composite material.

For example, for both these material types, the method according to the present embodiments is most suitable since conventional methods of such kind are not either sufficiently accurate or involve to many tests. The present embodiments reduce the test number due to the application of the material model.

Another embodiment provides that in case the component is at least in the critical area additive manufactured, the at least one material condition includes: surface condition or surface roughness; defects; inclusions; microstructure; orientation of printing layers of an additive manufactured part; temperature history; residual stress; printing parameters of additive manufacturing, or any combination thereof.

Another embodiment provides that in case the component is at least in the critical area of composite material the at least one material condition includes: surface condition or surface roughness; defects; texture; inclusions; microstructure; temperature history; residual stress; curing cycle; or any combination thereof.

Another embodiment provides that the method according to the present embodiments may include an additional act before act (d) of providing at least one material condition. The additional act includes: providing a manufacturing process plan for the component; and monitoring and/or simulating a manufacturing process plan of the component according to the manufacturing process plan.

This embodiment enables, in the simulation option, to first make the test coupon and test if the requirements are met before manufacturing the component. In general, this feature enables to accurately consider manufacturing process parameters and options in the test coupon selection.

To enable a full consideration of load spectrums without excessive analysis during the strength analysis, the method may include an additional act before act (a) determining a load condition for said component. The additional act includes: providing an operating load spectrum for the component; and determining a load condition from an operating load spectrum of said component.

The present embodiments may be implemented as a system adapted for carrying out a method according to an embodiment. The system includes at least one processing unit being configured to perform computer-implemented acts (a), (c), (g). According to another embodiment, the system includes at least one processing unit that may be adapted to also perform computer-implemented acts (b) and/or (d) and/or (e) and/or (f).

BRIEF DESCRIPTION OF THE DRAWINGS

Embodiments of the invention are herein described, by way of example only, with reference to the accompanying drawings, of which.

The illustration in the drawings is in schematic form. In different figures, similar or same elements may be provided with the same reference signs.

DETAILED DESCRIPTION

Although the present invention is described in detail with reference to embodiments, it is to be understood that the present invention is not limited by the disclosed examples, and that numerous additional modifications and variations may be made thereto by a person skilled in the art without departing from the scope of the invention.

The use of "a" or "an" throughout this application does not exclude a plurality, and "comprising" does not exclude other steps or elements. Also, elements described in association with different embodiments may be combined. Reference signs in the claims should not be construed as limiting the scope of the claims.

Figure 1:
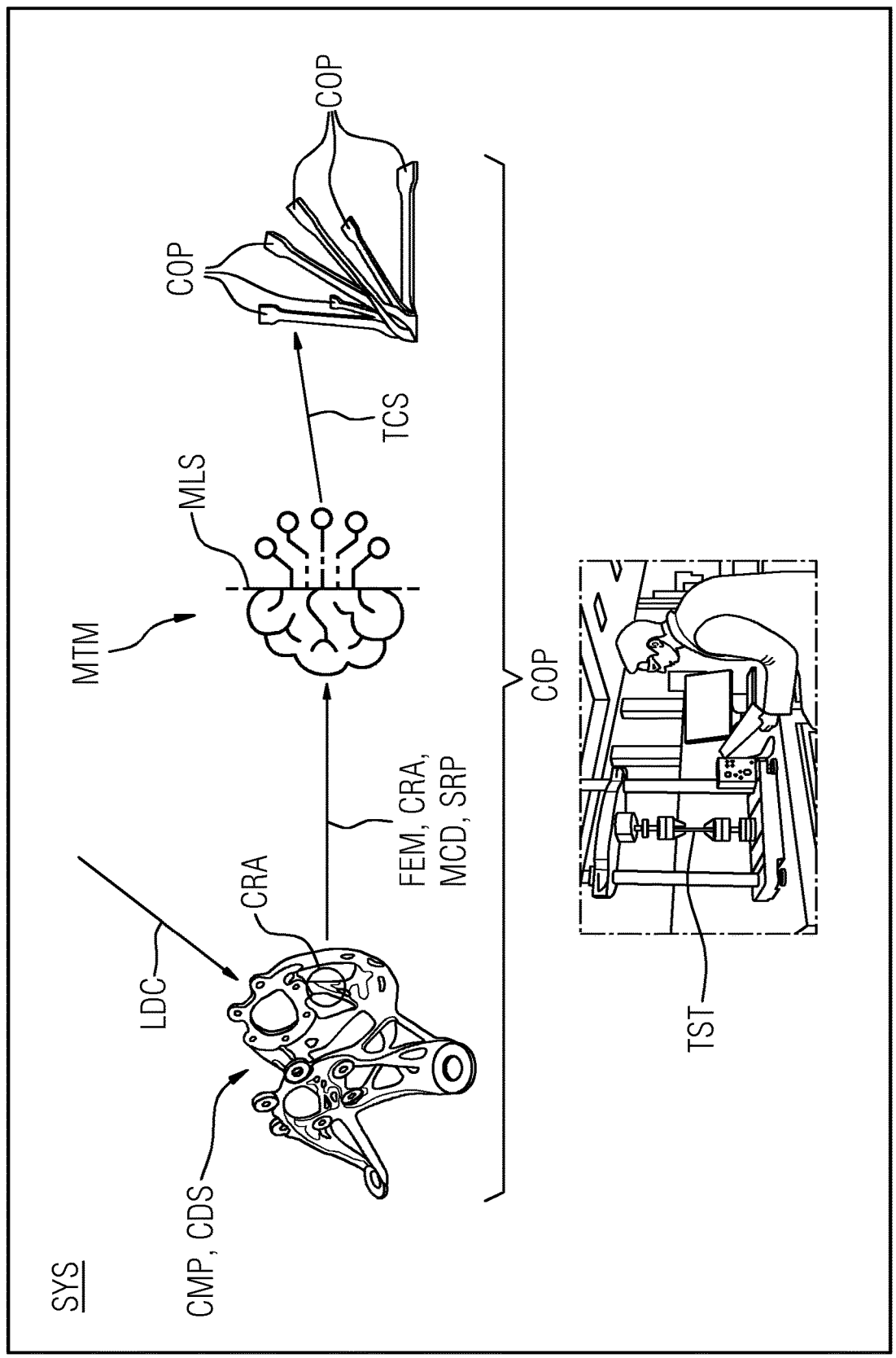
FIG. 1 shows a simplified schematic illustration of a system for predicting fatigue life of a component by applying a method according to an embodiment.

FIG. 1 shows a simplified schematic illustration of a system SYS for predicting fatigue life of a component CMP by applying the method according to the present embodiments.

Starting with a component's CMP design CDS being put under a load condition LDC, strength analysis FEM of the component CMP is performed. During the strength analysis SVM, a critical area CRA and at least one stress-related parameter SRP are determined. Together with at least one material condition MCD, these results are provided to a material model MTM. The at least one material condition MCD may include: surface condition or surface roughness, defects, inclusions, microstructure, temperature history, residual stress, orientation of printing layers of additive manufacturing or printing parameters of additive manufacturing in case the critical area CRA is additively manufactured, curing cycle or texture in case the critical area CRA is of composite material, or any combination thereof.

An analysis of these parameters provided by the material model MTM (e.g., by calculation of the covariance) may generate a sorted list of coupons, where the coupon with the highest correlation is the one to be tested. The material model MTM generates as an output a test coupon COP specification TCS for being tested in a testing machine TST. The test coupon COP specification TCS may include a full geometric specification (e.g., a complete material specification and a complete manufacturing process plan).

Figure 2:
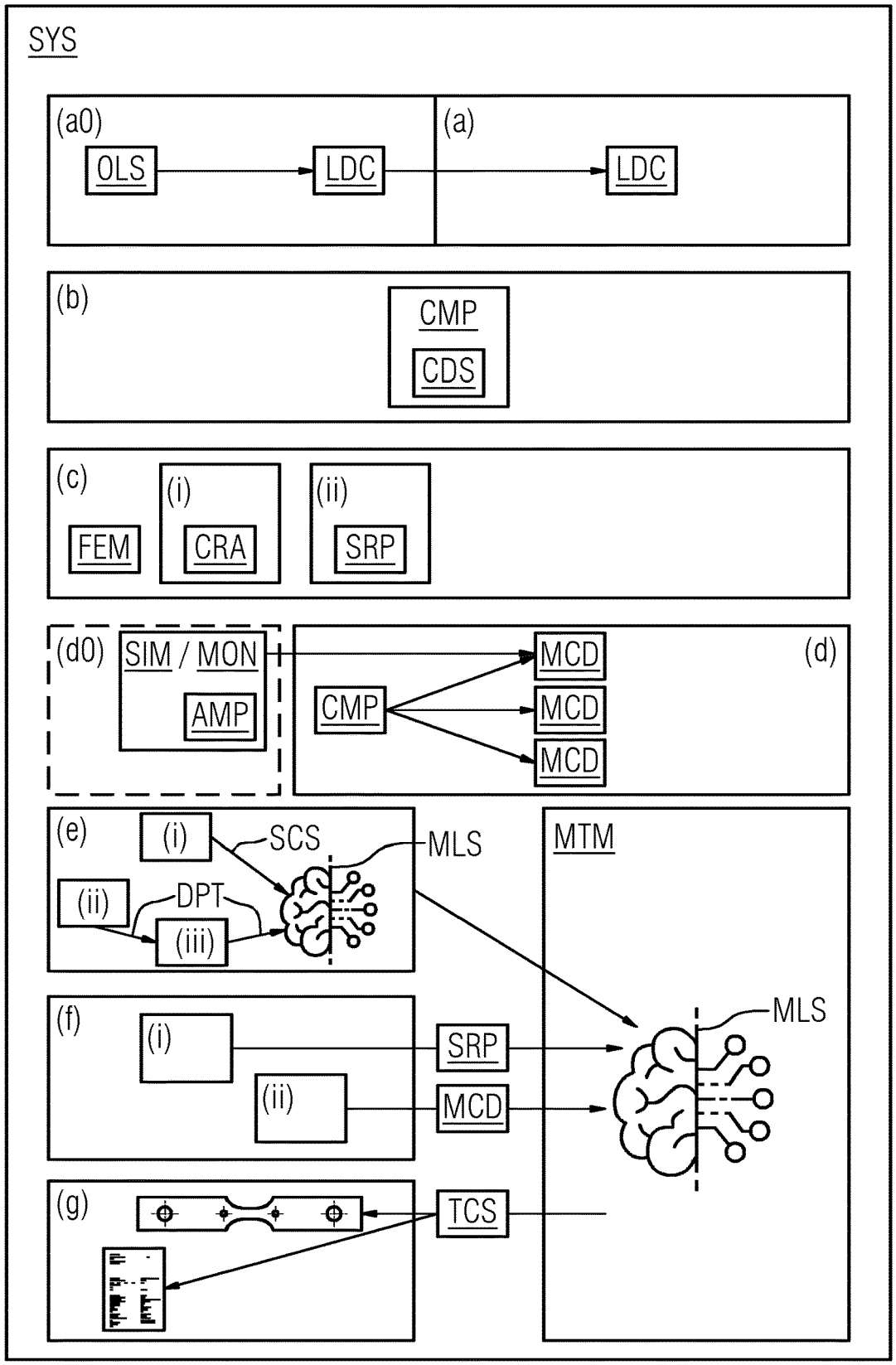
FIG. 2 shows a schematic flow diagram of a method according to an embodiment.

FIG. 2 shows a schematic flow diagram of a method according to the present embodiments.

As a preparation act (a0), the method according to the present embodiments may include an additional act before act (a) by determining a load condition LDC for the component CMP, which may be done by: providing an operating load spectrum OLS for the component CMP; and determining a load condition LDC from an operating load spectrum of the component CMP. This kind of preparation enables a more efficient subsequent analysis. The load condition may also be termed an equivalent operational load.

Subsequently, the following acts are performed: (a) determining a load condition LDC for the component CMP; (b) providing a component CMP design CDS; and (c) performing a strength analysis FEM of the component CMP design under the load condition LDC determining (i) a critical area CRA of the component CMP and (ii) at least one stress-related parameter SRP of the critical area CRA.

Optionally, the method may include an additional act (d0) (illustrated with the dotted line frame) before below act (d) of providing at least one material condition MCD. The additional act (d0) includes: providing a manufacturing process plan AMP for the component CMP; and monitoring MON and/or simulating SIM according to the manufacturing process plan AMP of the component CMP according to the manufacturing process plan AMP. This additional act (d0) enables recorded parameters of the manufacturing process, or its simulation, to be considered as a material condition MCD in the following act (d).

Subsequent act (d) includes providing at least one material condition MCD of the component CMP at least for the critical area of the component CMP.

According to the present embodiments, a material model MTM is (e) provided receiving as an input (e.g., act (f)): (i) the at least one stress-related parameter SRP; and (ii) the at least one material condition MCD.

In act (g), the material model MTM generates as an output a test coupon COP specification TCS for being tested in a testing machine TST. As explained below, the material model MTM may have been trained to select a test coupon specification TCS from the set of test coupon specifications SCS when receiving as an input: (i) the at least one stress-related parameter SRP; and (ii) the at least one material condition MCD.

An additional subsequent act as illustrated in FIG. 1 is the generation of the test coupon COP and conduction of the coupon test.

The material model MTM may be a machine learning fatigue model MLS. The machine learning model may be provided by a method including the acts (e) of: (i) Providing a set of test coupon specifications SCS to the material model MTM, where the test coupon specifications SCS include different material conditions MCDs of the component CMP; (ii) collecting data points DPT for maximum stress vs. cycles to failure are collected for the test coupon specifications SCS; and (iii) training the material model MTM with the collected data.

Each of acts (a)-(g), individually or all, may be computer implemented to be performed by at least one processing unit CPU of the system SYS. For example, the system SYS may include at least one processing unit CPU being adapted to perform computer-implemented acts (a), (c), (g).

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating a test coupon specification for predicting fatigue life of a component, the component being a mechanical component, the method comprising:
   determining a load condition for the component;
   providing a model for a component design;
   performing a strength analysis on the component design under the load condition, such that a critical area of the component and at least one stress-related parameter of the critical area are determined;
   providing at least one material condition of the component at least for the critical area of the component;
   providing a material model, the material model being a machine learning fatigue model;
   providing the at least one stress-related parameter and the at least one material condition as an input to the machine learning fatigue model;
   generating, by a processor executing the machine learning fatigue model, as an output, the test coupon specification for being tested in a testing machine, wherein the machine learning fatigue model is provided by a method comprising:
      providing a set of test coupon specifications to the machine learning fatigue model, wherein the set of test coupon specifications comprises different material conditions of the at least one material condition of the component;
      collecting data points for maximum stress versus cycles to failure for the test coupon specifications; and
      training the machine learning fatigue model with the collected data points and selecting a test coupon specification from the set of test coupon specifications by applying the at least one stress-related parameter and the at least one material condition to the trained machine learning fatigue model as inputs; and
   producing a test coupon based on the generated test coupon specification, the produced test coupon being a physical device usable for fatigue prediction of the component.

2. The method of claim 1, wherein at least the critical area of the component is additively manufactured.

3. The method of claim 2, wherein a material condition of the at least one material condition is:
   a surface condition or a surface roughness;
   defects;
   inclusions;
   microstructure;
   orientation of printing layers of an additive manufactured part;
   temperature history;
   residual stress; or
   printing parameters of additive manufacturing.

4. The method of claim 3, further comprising, before the providing of the at least one material condition:
   providing a manufacturing process plan for the component; and
   monitoring, simulating, or monitoring and simulating according to the manufacturing process plan of the component according to the manufacturing process plan.

5. The method of claim 3, further comprising, before the determining of the load condition for the component:
   providing an operating load spectrum for the component; and
   determining a load condition from an operating load spectrum of the component.

6. The method of claim 1, wherein at least the critical area of the component is made of composite material.

7. The method of claim 6, wherein a material condition of the at least one material condition is:
   a surface condition or a surface roughness;
   defects;
   texture;
   inclusions;
   microstructure;
   temperature history;
   residual stress; or
   a curing cycle.

8. The method of claim 7, further comprising, before the providing of the at least one material condition:
   providing a manufacturing process plan for the component; and
   monitoring, simulating, or monitoring and simulating according to the manufacturing process plan of the component according to the manufacturing process plan.

9. The method of claim 7, further comprising, before the determining of the load condition for the component:
   providing an operating load spectrum for the component; and
   determining a load condition from an operating load spectrum of the component.

10. The method of claim 6, further comprising, before the providing of the at least one material condition:
   providing a manufacturing process plan for the component;

monitoring, simulating, or monitoring and simulating according to the manufacturing process plan of the component according to the manufacturing process plan.

11. The method of claim 6, further comprising, before the determining of the load condition for the component:
    providing an operating load spectrum for the component; and
    determining a load condition from an operating load spectrum of the component.

12. The method of claim 1, further comprising, before the providing of the at least one material condition:
    providing a manufacturing process plan for the component; and
    monitoring, simulating, or monitoring and simulating according to the manufacturing process plan of the component according to the manufacturing process plan.

13. The method of claim 12, further comprising, before the determining of the load condition for the component:
    providing an operating load spectrum for the component; and
    determining a load condition from an operating load spectrum of the component.

14. The method of claim 1, further comprising, before the determining of the load condition for the component:
    providing an operating load spectrum for the component; and
    determining a load condition from an operating load spectrum of the component.

15. The method of claim 1, wherein the generated test coupon specification includes a complete material specification and a complete manufacturing process plan.

16. The method of claim 15, further comprising conducting a coupon test on the produced test coupon using a testing machine.

\* \* \* \* \*